(12) United States Patent
Kao

(10) Patent No.: US 8,695,088 B2
(45) Date of Patent: Apr. 8, 2014

(54) DYNAMICALLY CONSTRUCTED CAPABILITY FOR ENFORCING OBJECT ACCESS ORDER

(75) Inventor: I-Lung Kao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 13/466,764

(22) Filed: May 8, 2012

(65) Prior Publication Data
US 2012/0227083 A1   Sep. 6, 2012

Related U.S. Application Data

(63) Continuation of application No. 12/577,283, filed on Oct. 12, 2009, now Pat. No. 8,495,730.

(51) Int. Cl.
*H04L 29/06* (2006.01)
(52) U.S. Cl.
USPC .................. 726/21; 726/2; 713/155; 713/156; 713/157
(58) Field of Classification Search
None
See application file for complete search history.

(56) References Cited

U.S. PATENT DOCUMENTS

| 8,302,205 | B2 * | 10/2012 | Kanai | 726/27 |
|---|---|---|---|---|
| 2002/0178119 | A1 | 11/2002 | Griffin et al. | |
| 2004/0225896 | A1 | 11/2004 | Ng | |
| 2007/0233883 | A1 | 10/2007 | De Lutiis et al. | |
| 2011/0088079 | A1 | 4/2011 | Kao | |

FOREIGN PATENT DOCUMENTS

| WO | WO 02/103498 A2 | 12/2002 |
|---|---|---|
| WO | WO 03/015342 A1 | 2/2003 |
| WO | WO 2004/063960 A1 | 7/2004 |

OTHER PUBLICATIONS

Kao et al.; "An Extended Capability Architecture to Enforce Dynamic Access Control Policies"; ACSAC: Proceedings of the 12th Annual Computer Security Applications Conference; p. 148; 1996.
International Searching Authority; PCT International Search Report and Written Opinion; Nov. 29, 2010.

* cited by examiner

*Primary Examiner* — Pramila Parthasarathy
(74) *Attorney, Agent, or Firm* — Libby Z. Toub; Gregory K. Goshorn; Greg Goshorn, P.C.

(57) ABSTRACT

Proposed is a Capability Management System (CMS) in a distributed computing environment that controls access to multiple objects by multiple subjects based upon a specified access order. A capability is dynamically constructed when the capability is needed. After the capability is used to access an object, a new capability is generated. In the alternative, multiple capabilities for enforcing an access order are generated independently of each other. The new capability is then employed by the same or another subject to access the object according to a prescribed access sequence. In this manner, at any particular time there is one capability valid to access the object by the appropriate subject. In addition, the capability includes information for verifying the authenticity of the capability and for specifying an expiration time associated with the capability. The technology may also be enhanced by providing a linkage between capabilities intended for use in a sequence.

13 Claims, 5 Drawing Sheets

| CapabilityDescriptorObject | |
|---|---|
| cdoID: | CDObjectID |
| subjectID: | Vector |
| objectID: | ObjectID |
| accessRights: | Integer |
| expiration: | DateTimeInfo |
| nextSubject: | Vector |
| nextObject: | Vector |
| nextAccessRights: | Vector |
| integrityCheck: | Integer |
| policy: | PolicyObject |
| createNextCap<br>() | |
| updateExpiration<br>(newExpiration: | DateTimeInfo) |

172 — (top box)
174 — (attributes section)
176 — (methods section)
178 — cdoID
179 — subjectID
180 — objectID
181 — accessRights
182 — expiration
183 — nextSubject
184 — nextObject
185 — nextAccessRights
186 — integrityCheck
187 — policy
192 — createNextCap
193 — updateExpiration

DYNAMICALLY CONSTRUCTED CAPABILITY FOR ENFORCING OBJECT ACCESS ORDER

CROSS-REFERENCES TO RELATED APPLICATIONS

The present application is a continuation and claims the benefit of the filing date of an application entitled, "Dynamically Constructed Capability For Enforcing Object Access Order" Ser. No. 12/577,283, filed Oct. 12, 2009, now U.S. Pat. No. 8,495,730, issued Jul. 23, 2013, assigned to the assignee of the present application, and herein incorporated by reference.

FIELD OF DISCLOSURE

The claimed subject matter relates generally to access control in a computing system and, more specifically, to a mechanism for controlling resources with a Capability Management System (CMS).

SUMMARY

A capability object, or simply "capability," is a popular mechanism for access control in a distributed system. When a "subject," or process acting on behalf of an authenticated user, accesses an object, the subject presents a capability that indicates access rights to the object. An object manager controlling access to the object verifies both the genuineness of the capability and whether or not the access request is permitted by the rights stored within the capability. It has been noted that a capability has several advantages over a centralized Access Control List (ACL) especially in a distributed system. One advantage is that an access control decision can be performed locally and efficiently simply based upon information stored in the capability rather than searching a potentially large ACL.

As the Inventors herein have recognized, many business applications have policy requirements that control access to an object by multiple subjects in a specific order. For example, an accounting application system may require an electronic check (object 1) issued to an employee must be prepared by an office clerk (subject 1), verified with respect to the employee's eligibility to receive the check by a human resource (HR) employee (subject 2), and then signed and issued by an accounting manager (subject 3). In other words, access to a particular check must proceed from a clerk to HR and then to accounting personnel. Another example is that of a time card processing system in which a time card (object 1) must be tilled out by a contract worker (subject 1), signed by a service manager (subject 2) and then recoded in the company's financial system by a person in the accounting office (subject 3). As the Inventors have also recognized, a traditional capability is not suitable for enforcing such a dynamic access control policy in which access to the object by multiple subjects in a particular order is required.

Proposed are techniques for dynamically constructing capabilities, including a Capability Management System (CMS), in a distributed computing environment that controls access to one or more objects by multiple subjects based upon a specified access order. A capability is dynamically constructed when the capability is needed. After the capability is used to access an object, the capability is revoked and a new capability is generated. The new capability is then used by the same or another subject to access the object according to a prescribed access sequence. In this manner, at any particular time there is one capability valid to access the object by the appropriate subject. Like a traditional, static capability, the capability includes information for verifying the authenticity of the capability and for specifying an expiration time associated with the capability.

The disclosed technology also provides a linkage between capabilities intended for use in a sequence. Additional information is embedded in a capacity to provide information necessary to construct one or more subsequent capabilities in a particular sequence. The additional information may be, but is not limited to, an actual block of information corresponding to the next subject and/or object or a link or other type of reference to the necessary access order information.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

FIG. 3 is a block diagram of a CapacityDescriptorObject, which is an example of memory object that may be employed to implement the claimed subject matter.

DETAILED DESCRIPTION

Figure 1:
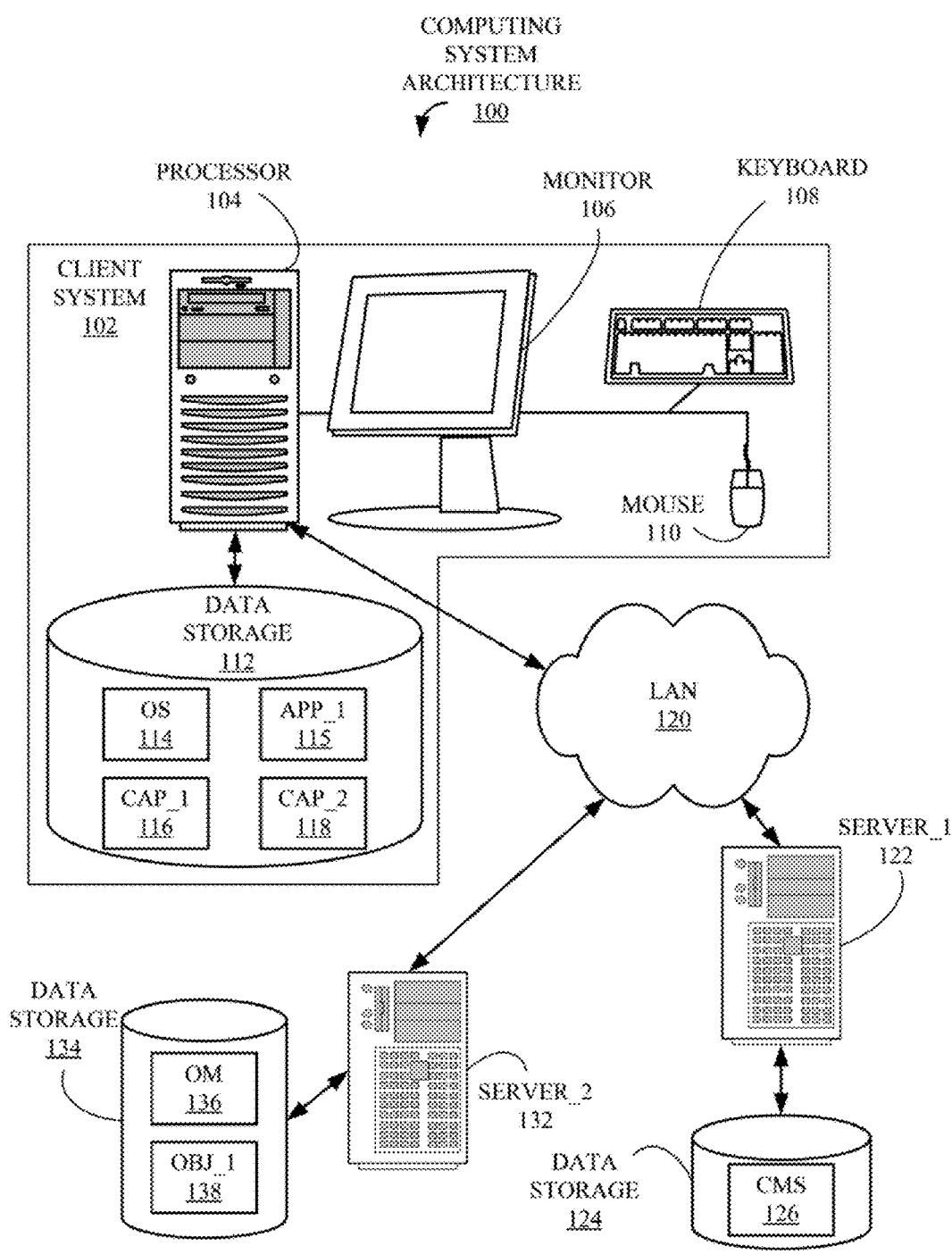
FIG. 1 is one example of a distributed computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for controlling access to computing system resources. The term "programmed method", as used herein, is defined to mean one or more process steps that are presently performed; or, alternatively, one or more process steps that are enabled to be performed at a future point in time. The term 'programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C." programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is one example of a distributed computing system architecture 100 that may implement the claimed subject matter. A client system 102 includes a central processing unit (CPU), or processor, 104, coupled to a monitor 106, a keyboard 108 and a mouse 110, which together facilitate human interaction with computing system 100 and client system 102. Also included in client system 102 and attached to processor 104 is a data storage component 112, which may either be incorporated into processor 104 i.e. an internal device, or attached externally to processor 104 by means of various, commonly available connection devices such as but not limited to, a universal serial bus (USB) port (not shown). Data storage 112 is illustrated storing an operating system (OS) 114; a computer software application, or app_1, 115, which is employed as an example throughout the Specification to represent logic that may request access to an object; and two capability objects, i.e. a cap_1 116 and a cap_2 118, which are employed as examples of resources that are to be created and manipulated in some fashion according to the techniques of the claimed subject matter. It should be noted that although cap_1 116 and cap_2 118 are both illustrated, typically only one would be stored at any particular time. As explained below in conjunction with FIGS. 2-5, cap_1 116 may be utilized and then cap_2 118 is generated based upon the utilization of cap_1 116.

Examples of computing objects include, but are not limited to, a check issued by a company and an employee timecard that must be generated, verified and otherwise processed. Those with skill in the art should appreciate that typical business or other type of processing would include the creation and manipulation of many different types of objects of which a check and a timecard are merely two simple examples. It should be noted that most computing systems would typically include more than one application and more than one object, but for the sake of simplicity only one of each is shown in conjunction with client system 102.

Client system 102 and processor 104 are connected to a local area network (LAN) 120, which is also connected to a server computer, i.e. server_1 122. Although in this example, processor 104 and server_1 122 are communicatively coupled via LAN 120, they could also be coupled through any number of communication mediums such as, but not limited to, a wide area network (WAN) (not shown) or the Internet (not shown). Server_1 122 includes a data storage 124 that is illustrated storing a Capability Management System (CMS) 126. CMS 126 is described in more detail below in conjunction with FIGS. 2-5.

Also coupled to LAN 120 and therefore client system 102 and server_1 122 is a second server system, i.e. server_2 132, used for illustrative purposes. Server_2 132 includes a data storage 134, which is illustrated storing an object manager, i.e. OM 136, and an object, i.e. obj_1 138. Although not illustrated, both server_1 122 and server_2 132 include a processor, monitor, keyboard and mouse like components 104, 106, 108 and 110. It should be noted that a typical configuration may include additional objects and that both additional objects and object managers may be located on other computing devices such as, but not limited to server 122. It should be also noted there are many possible computing system configurations, of which computing system 100 is only one simple example. OM 136, which receives and verifies capabilities and either enables of disables access to computing objects based upon the result of the verification, is described in more detail below in conjunction with FIG. 5

Figure 2:
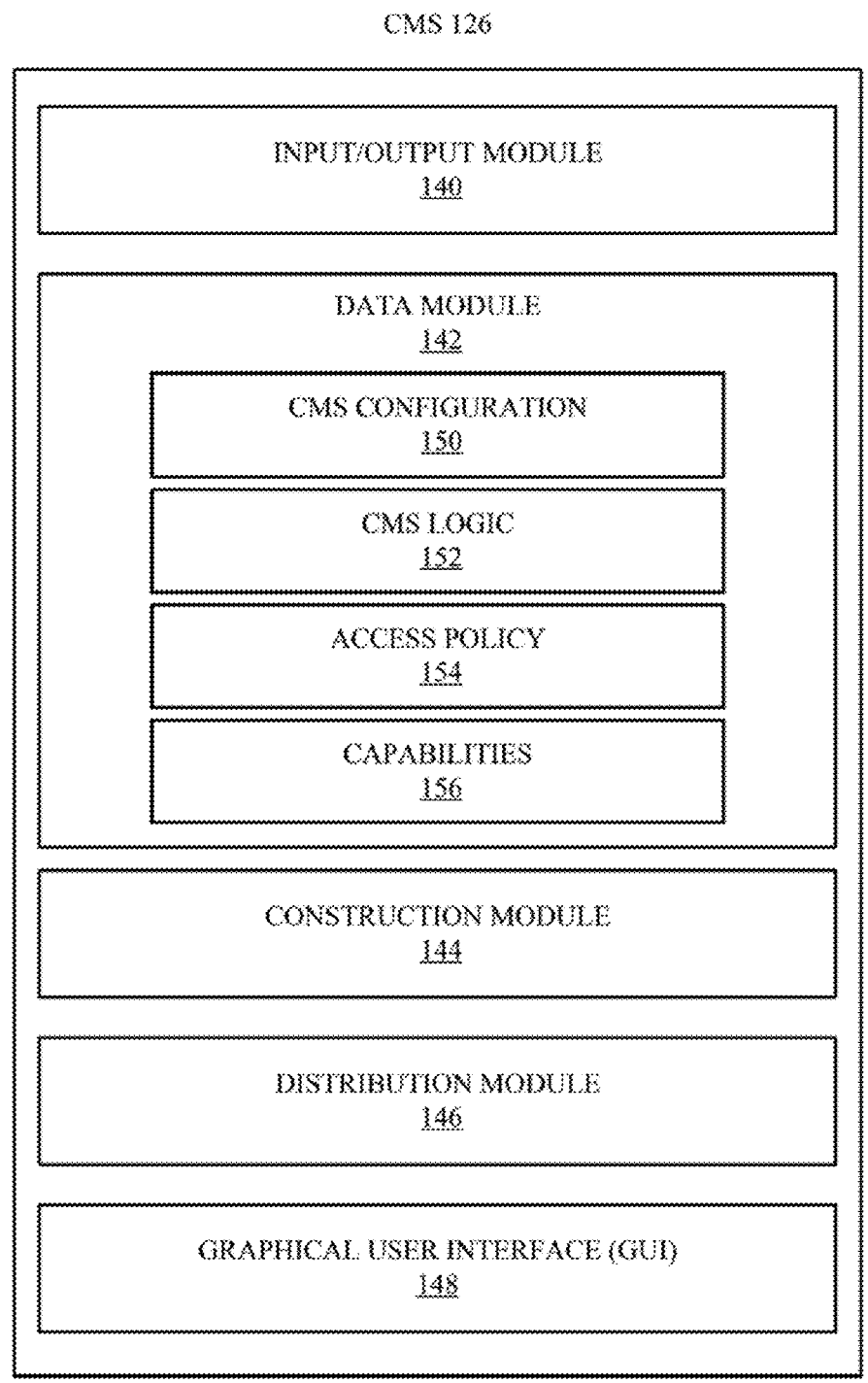
FIG. 2 is a block diagram of a Capability Management System (CMS), first introduced in conjunction with FIG. 1, which implements aspects of the claimed subject matter.

FIG. 2 is a block diagram of a Capability Management System (CMS) 126, first introduced in conjunction with FIG. 1, which implements aspects of the claimed subject matter. In this example, CMS 126 is stored on data storage 124 (FIG. 1) and executed on server_1 122 (FIG. 1). CMS 126 is responsible for the generation and subsequent management of capability objects, or capabilities, such as cap_1 116 and cap_2 118. It should be understood that the claimed subject matter can be implemented in many types of computing systems and data storage structures but, for the sake of simplicity, is described only in terms of server_1 122 and system architecture 100 (FIG. 1). The generation and management of capabilities are described in more detail below in conjunction with FIGS. 3-5.

CMS 126 includes an input/output (I/O) module 140, a data module 142, a construction module 144, a distribution module 146 and a graphical user interface (GUI) module 148. The representation of CMS 126 in FIG. 2 is a logical model. In other words, components 140, 142, 144, 146 and 148 may be stored in the same or separates files and loaded and/or executed within system 100 either as a single system or as separate processes interacting via any available inter process communication (IPC) techniques.

I/O module 140 handles any communication CMS 126 has with other components of system 100. Data cache 142 is a data repository for information that CMS 126 requires during normal operation. Examples of the types of information stored in data cache 142 include CMS configuration data 150, CMS logic 152, access policy data 154 and capabilities data 156. CMS configuration 150 stores information that controls the operation of CMS. CMS logic 152 is executable logic that is executed with respect to CMS 126. Access policy 154 includes, but is not limited to, information related to authorized users, computing objects and the policies that control the relationships between the two. Capabilities 156 stores information on capabilities such as cap_1 116 and cap_2 118.

Construction module 144 is responsible for the generation of capabilities such as cap_1 116 and cap_2 118. Distribution module 144 works in conjunction with I/O module 140 to distribute capabilities generated by construction module 144 to authorized parties. GUI component 148 enables users of CMS 126 to interact with and to define the desired functionality of CMS 126 by the manipulation of data module 142 and components 150, 152 and 154. Components 142, 144, 146, 148, 150, 152, 154 and 156 are described in more detail below in conjunction with FIGS. 3-5.

FIG. 3 is a block diagram of a CapabilityDescriptorObject memory object (CDO) 170, which is an example of memory object that may be employed to implement the claimed subject matter. CDO 170 includes a title section 172, which merely states the name of object 170, i.e. "CapabilityDescriptorObject," an attribute section 174, which contains memory elements, or attributes, associated with CDO 170, and a method section 176, which includes functions, or methods, that may be executed in conjunction with CDO 170. It should be noted that the attributes and methods described are used for the purpose of illustration only. Additional and/or different attributes and methods may be employed to implement the claimed subject matter.

Attribute section 172 includes an "cdoID" attribute 178, a "subjectID" attribute 179, an "objectID" attribute 180, an "accessRights" attribute 181, an "expiration" attribute 182, a "nextSubject" attribute 183, a "nextObject" attribute 184, a "nextAcccessRights" attribute 185, an "integrityCheck" attribute 186 and a "policyData" attribute 187. Instantiations of object 170 may be stored in capacities 156 (FIG. 2) of data module 142 (FIG. 2) of CMS 126 (FIGS. 1 and 2). Instantiations of object 170 may also be stored on computing devices such as client system 102 (FIG. 1) on which object 170 is deployed according to the disclosed techniques.

CdoID attribute 178 is a variable of type CDObjectID that contains a reference to the particular instance of object 170. Each instance of object 170 has a unique value for attribute 178 that allows each instance to be uniquely identified. SubjectID attribute 179 is a variable of type Vector that stores one or more attributes of type SubjectID that identify specific parties authorized to employ CDO 170 to access an computing object such as obj_1 138 (FIG. 1). ObjectID attribute 180 is a variable of type ObjectID that stores information identifying specific computing objects, such as obj_1 138, that the subjects identified by attribute 179 are authorized to access and/or execute.

AccessRights attribute 181 is a variable of type Integer that stores information identifying specific rights the a subject identified by attribute 179 have with the objects identified by attribute 180. Attribute 181 stores rights as bits in an integer variable, each of which indicates whether a particular, corresponding access right is enabled or disabled.

Expiration attribute 182 is a variable of type DateTimeInfo that stores information identifying an expiration data and time for the corresponding object. A NULL value stored in attribute 182 may indicate that the corresponding capability is invalid, expired or does not have a set expiration data, depending upon data stored in CMS configuration 150 (FIG. 2).

NextSubject attribute 183 is a variable of type Vector that stores information identifying one or more subjects corresponding to successor capabilities. In other words, once the capability identified by cdoID 178 has been used to access an object identified by attribute 180, attribute 183 enables CMS 126 to generate another capability representing a next step in a particular procedure. In an alternative embodiment, rather than storing information pertaining to actual subjects, attribute 183 may store a pointer to the location of this information, perhaps stored in conjunction with CMS 126. In addition, CDO 170 may not store any such information, in which case the generation of a subsequent capability is accomplished by CMS 126 with information stored in conjunction with CMS 126.

NextObject attribute 184 is a variable of type Vector that stores information identifying one or more computing objects corresponding to successor capabilities. NextAccessRights attribute 185 is a variable of type Vector that stores information identifying that specific access rights corresponding to successor capabilities. Like attribute 183, attributes 184 and 185 may enable CMS 126 to generate another capability representing a next step in a particular procedure. Also like attribute 183, in the alternative, attributes 184 and 185 may store pointers to information or not be included at all, in which case the generation of any subsequent capabilities are generated by CMS 126 using information stored in conjunction with CMS 126.

IntegrityCheck attribute 186 is a variable of type Integer that stores information that enables both CMS 126 and OM 136 (FIG. 1) to verify the integrity of CDO 170. Those with skill in the arts should understand such methods for "signing" an object by employing various hashing and other cryptography techniques to authenticate the authenticity and integrity of CDO 170. Policy attribute 187 is a variable of type PolicyObject that stores information identifying the manner in which a OM 136 interprets the access rights stored in attribute 181 according to particular polices stored in access policy 154 (FIG. 2).

Method section 176 of object 170 includes two exemplary functions, or methods. Only two methods are illustrated for the sake of simplicity. Those with skill in the programming arts should appreciate that an object such as object 170 would typically include many additional methods including, but not limited to, constructors, destructors, and methods to set and get values for various attributes.

A "createNextCap" method 192 is called during a Generate Cap. block 214 explained in more detail below in conjunction with FIG. 4. Method 192 is called to generate a subsequent capability by using information stored in either attributes 183, 184 and 185 or stored in conjunction with data module 142 of CMS 126. The generation of a capability is explained in more detail below in conjunction with FIG. 4.

An "updateExpiration" method 193 is called to modify the value stored in expiration attribute 182. It should be understood that a modification of any attribute would typically also involve a regeneration of integrityCheck attribute 186 to insure the authenticity of capability 170. As explained above, setting the value of attribute 193 to NULL may indicate that CDO 170 is either invalid, expired or does not have a set expiration data, depending upon data stored in CMS configuration 150.

It should be understood that CDO object 170 is only one example of a memory object that may be used to implement the claimed subject matter. Other memory objects with fewer, more and/or different attributes and methods may be employed. In addition, there are many ways other than employing object 170 to implement the functionality and data storage of the claimed subject matter. For example, the claimed subject matter may be implemented by means of a computer program in conjunction with a relational database.

Figure 4:
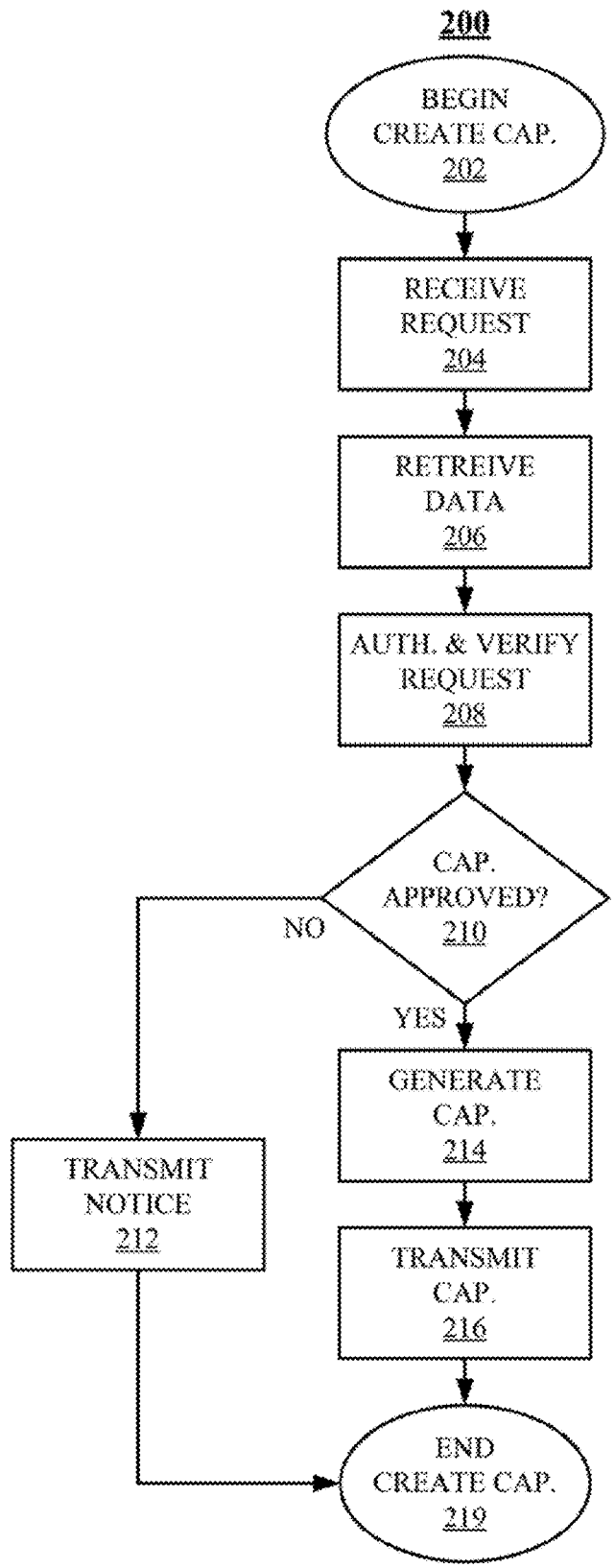
FIG. 4 is a flow chart describing one example of a Create Capacity process that may be employed to implement an aspect of the claimed subject matter.

FIG. 4 is a flow chart describing one example of a Create Capability (Cap.) process 200 that may be employed to implement an aspect of the claimed subject matter. In this example, logic associated with process 200 is stored on data storage 124 (FIG. 1) as part of CMS 126 (FIG. 1) and executed on server 122 (FIG. 1).

Process 200 starts in a "Begin Create Cap." block 202 and proceeds immediately to a "Receive Request" block 204. During block 204, process 200 receives a request to generate a capability according to the techniques of the claimed subject matter. For the purposes of this example, the request is transmitted by app_1 115 (FIG. 1), which is attempting to access obj_1 138 (FIG. 1). Such a request may be transmitted by app_1 115 as an initial request to access obj_1 138 or may take the form of another capability that has been used to access either obj_1 138 or a different object. In the later case, the request may take the form of a capability that is "turned in" (see 248, FIG. 5) to CMS 126 after being successfully deployed by app_1 115 or some other entity. It should be also be understood that types of entities other than applications may request capabilities for objects that may or may not be stored on server 122. Although in this example, a capability is generated when another capability is turned in, e.g. cap_1 118 is generated once cap_2 116 has been used, in an alternative embodiment, all the capabilities necessary to enforce an access order to an object may be generated at the same time or independently of each other. Each capability only needs to be generated prior to use.

During a "Retrieve Data" block 206, process 200 retrieves data from access policy (FIG. 3) of data module 142 (FIG. 3) or, in the case of the request in the form of a capability that is being turned in, either from CMS 126 the turned-in capability itself, depending upon the manner in which the system is configured.

During an "Authenticate and Verify Request" block 208, process 200 authenticates the party that transmitted the request received during block 204 and verifies that the request is valid, i.e. that the request is permitted and any conditions placed upon the request have been met. During a "Cap. Approved?" block 210, process 200 determines whether or not the request has been authenticated and verified during block 208. If not, process 200 proceeds to a "Transmit Notice" block 212 during which the party or entity that transmitted the request is notified that the request has been denied, perhaps including some information for the reason for the denial.

If, during block 210, process 200 determines that the generation of a new capability has been approved, control proceeds to a "Generate Cap." block 214 (see 192, FIG. 3). During block 214, process 200 generates the next capability. In different embodiments, the information employed to generate the next capability may be stored in one or more different places. For example, information may be stored in conjunction with a previous capability (see 183-185, FIG. 3), in conjunction with CMS 126 or the information may be stored somewhere else and referenced by pointers within the previous capability of CMS 126.

In the following example, the capability generated during block 214 is cap_2 118. During a "Transmit Cap." block 216 transmits the new capability, e.g. cap_2 118, to the appropriate party. The appropriate party is the next entity or party authorized to take a next step in the process that is being managed. In this example, the next step in the process is also executed by app_1 115, although the next party may be a completely different application or entity on the same or a different computing device. In this manner, the next party may be both notified that the next step is ready and provided with the capability necessary to access the appropriate resources. Finally, once either a new capability has been transmitted during block 216 or a notice has been transmitted during block 212, control proceeds to an "End Create Cap." block 219 in which process 200 is complete.

Figure 5:
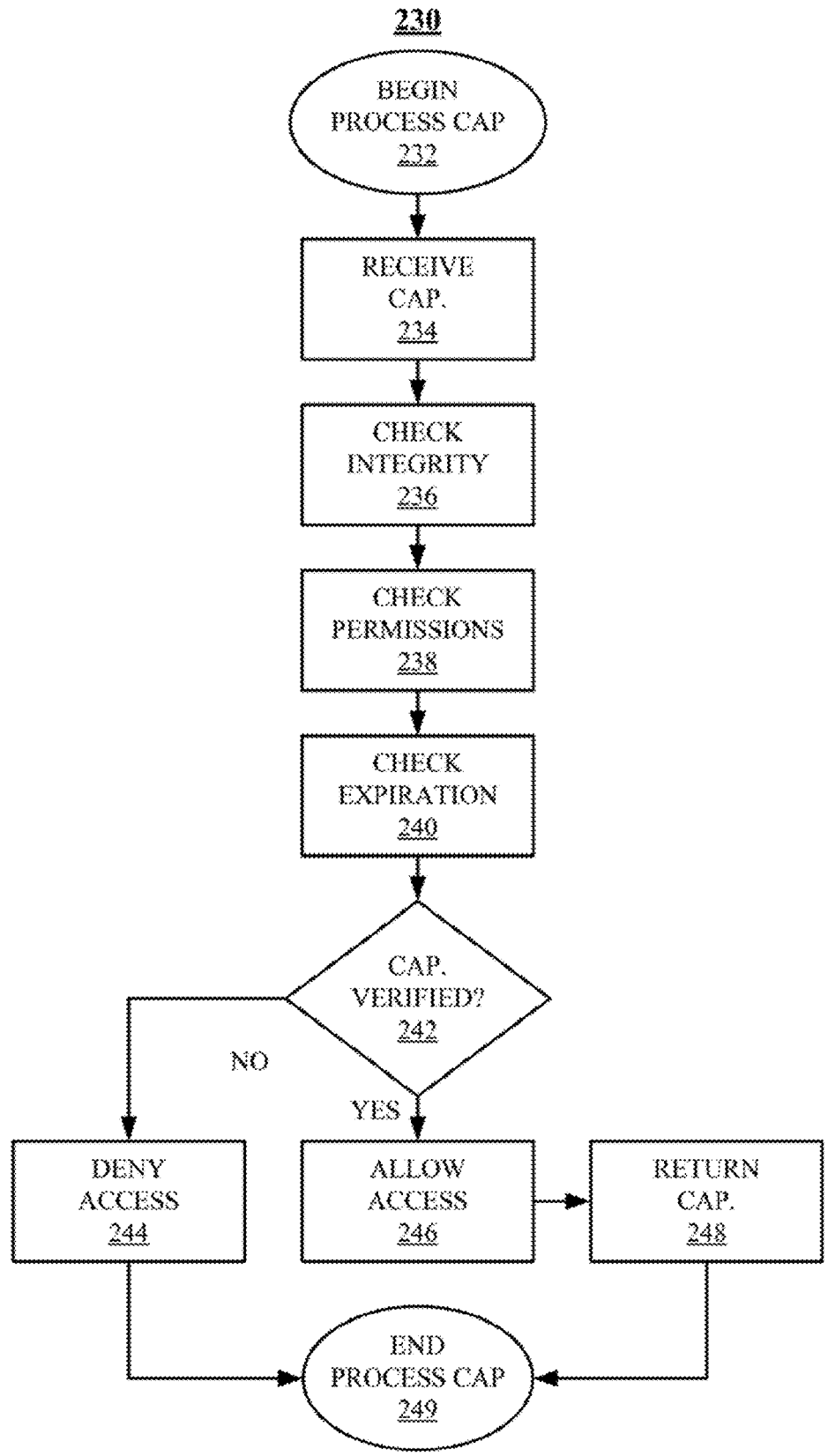
FIG. 5 is a flow chart describing one example of a Process Capacity process that may be employed to implement an aspect of the claimed subject matter.

FIG. 5 is a flow chart describing one example of a Process Capacity process 230 that may be employed to implement an aspect of the claimed subject matter. In this example, logic associated with process 230 is stored on data storage 134 (FIG. 1) as part of OM 136 (FIG. 1) and executed on server 132 (FIG. 1). As described above in conjunction with FIG. 4, this example is based upon app_1 115 (FIG. 1) employing cap_2 118 (FIG. 1) to execute a next step in a multi-step operation in which access is controlled by the claimed subject matter. It should be understood that app_1 115 and cap_2 118 are used as examples and that the claimed subject matter is equally applicable to access by multiple entities to multiple computing objects. For example, access to a first object by a first party may be a condition of access to a second object by a second party. Obviously, there are many possible combinations of parties and objects to which the claimed subject matter may be applied.

Process 230 starts in a "Begin Process Capability (Cap)" block 232 and proceeds immediately to a "Receive Cap." block 234. During block 234, process 230 receives cap_1 118, which has been transmitted by app_1 115, to gain access to, in this example, obj_1 138 (FIG. 1). During a "Check Integrity" block 236, process 230 verifies that cap_2 118 has not been altered, typically by comparing a value calculated on a hash of cap_2 118 to an attribute stored within cap_2 118 (see 186, FIG. 3). Assuming that cap_1 118 is verified during block 236, process 230 proceeds to a "Check Permissions" block 238 during which process 230 verifies that app_1 115 has the appropriate permissions (see 181, FIG. 3) to access obj_1 138. During a "Check Expiration" block 240, process 230 verifies that cap_2 118 has not expired (see 182, FIG. 3). In this example, it is assumed that the time on server_1 122 where a capability is generated is synchronized with the time on the server on which the capability is verified.

During a "Cap. Verified?" block 242, process 230 determines whether or not cap_2 118 has passed all conditions associated with blocks 236, 239 and 240. If so, process 230 proceeds to an "Allow Access" block 244 during which app_1 115 is permitted to access obj_1 138. During a "Return Cap." Block 248 cap_2 118 is transmitted to CMS 126 with an indication that cap_2 118 has been executed. Block 248 may also be contingent upon the successful completion of some specified action on obj_1 138 by app_1 115. In an alternative embodiment, cap_2 118 is not actually returned but rather OM 136 associates a status with obj_1 138 so that the next capability used to access obj_1 138 can be verified. As explained above, a capability may be generated once another capability has been used, capabilities associated with an object may be generated at various times prior to use, or some combination of the two approaches. In the case of capabilities generated independently of each other OM 136 would typically track an access status corresponding to an object to enforce a capability access order.

If, during block 242, process 230 determines that any conditions associated with blocks 236, 239 and 240 have not been met, control proceeds to a "Deny Access" block 246 during which an appropriate message is transmitted to app_1 115 and perhaps CMS 126 and/or OM 136 so that appropriate action may be taken, such as but not limited to logging the denial. Of course, process 230 may be configured to proceed to block 242 from blocks 236, 239 and 240 immediately upon the failure of a corresponding condition.

Finally, from either of blocks 244 or 248, process 230 proceeds to an "End Process Cap." block 249 in which process 230 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I claim:

1. A system for controlling an order of access to a computing resource, comprising:
   a memory;
   a processor couple to the memory;
   logic, stored on the memory for execution on the processor, for:
      generating a first capability object, the first capability object comprising a first set of attributes for enforcing an access policy corresponding to a computing object, the set of attributes comprising storage for:
      information specifying a party authorized to access the computing object; and
      information specifying a first authorized action with respect to the computing object by the first authorized party;
      generating a second capability object, the second capability object comprising a second set of attributes corresponding to the first set of attributes for enforcing the access control policy, the second set of attributes comprising storage for:
      information specifying a second party authorized to access the computing object; and
      information specifying a second authorized action with respect to the computing object by the second authorized party;
      enabling access to the computing object by the second party if the first party has completed the first authorized action; and denying access to the computing object by the second party if the first party has not completed the first authorized action.

2. The system of claim 1, the logic further comprising logic for generating the second capability object in response to an indication that the first party has completed the first authorized action.

3. The system of claim 1, the first set of attributes further comprises storage for information specifying the second authorized party and the second authorized action.

4. The system of claim 1, the first set of attributes further comprises storage for a pointer to the information specifying the second authorized party and second authorized action, the information stored in a memory remote from the first capability object.

5. The system of claim 1, the logic further comprising logic for:
   verifying the authenticity of the first capability object prior to enabling access to the computing object by the first party; and
   verifying the authenticity of the second capability object prior to enabling access to the computing object by the second party.

6. The system of claim 1, the set of attributes further comprising storage for information specifying an expiration time for the first capability; and the second set of attributes further comprising storage for information specifying an expiration time for the second capability.

7. The system of claim 1, the first set of attributes further comprising:
   storage for information specifying a first set of rights associated with the first authorized party and the computing object;
   the second set of attributes further comprises storage for information specifying a second set of rights associated with the second authorized party and the computing object, and
   the logic further comprising logic for:
      enforcing the first set of rights with respect to the first authorized party and the computing object; and
      enforcing the second set of rights with respect to the second authorized party and the computing object.

8. A computer programming product for controlling an order of access to a computing resource, comprising:
   a physical memory; and
   logic stored on the physical memory for execution on a processor, for:
      generating a first capability object;
      storing in the first capability object a set of attributes for enforcing an access policy corresponding to a computing object, wherein the set of attributes store information specifying a party authorized to access the computing object and information specifying a first authorized action with respect to the computing object by the first authorized party;
      generating a second capability object with a corresponding set of attributes for enforcing the access control policy, wherein the corresponding set of attributes store information specifying a second party authorized to access the computing object and information specifying a second authorized action with respect to the computing object by the second authorized party;
      enabling access to the computing object by the second party if the first party has completed the first authorized action; and
      denying access to the computing object by the second party if the first party has not completed the first authorized action.

9. The computer programming product of claim 8, further the logic further comprising logic for generating the second capability object in response to an indication that the first party has completed the first authorized action.

10. The computer programming product of claim 8, wherein the first capability object stores, in the first capability object, information specifying the second authorized party and the second authorized action.

11. The computer programming product of claim 8, wherein the first capability object stores a pointer to the information specifying the second authorized party and second authorized action, the information stored in a memory remote from the first capability object.

12. The computer programming product of claim 8, the logic further comprising logic for:
   verifying the authenticity of the first capability object prior to enabling access to the computing object by the first party; and
   verifying the authenticity of the second capability object prior to enabling access to the computing object by the second party.

13. The computer programming product of claim 8, wherein the set of attributes includes information specifying an expiration time for the first capability and the corresponding set of attributes includes information specifying an expiration time for the second capability.

* * * * *